United States Patent Office 3,729,383
Patented Apr. 24, 1973

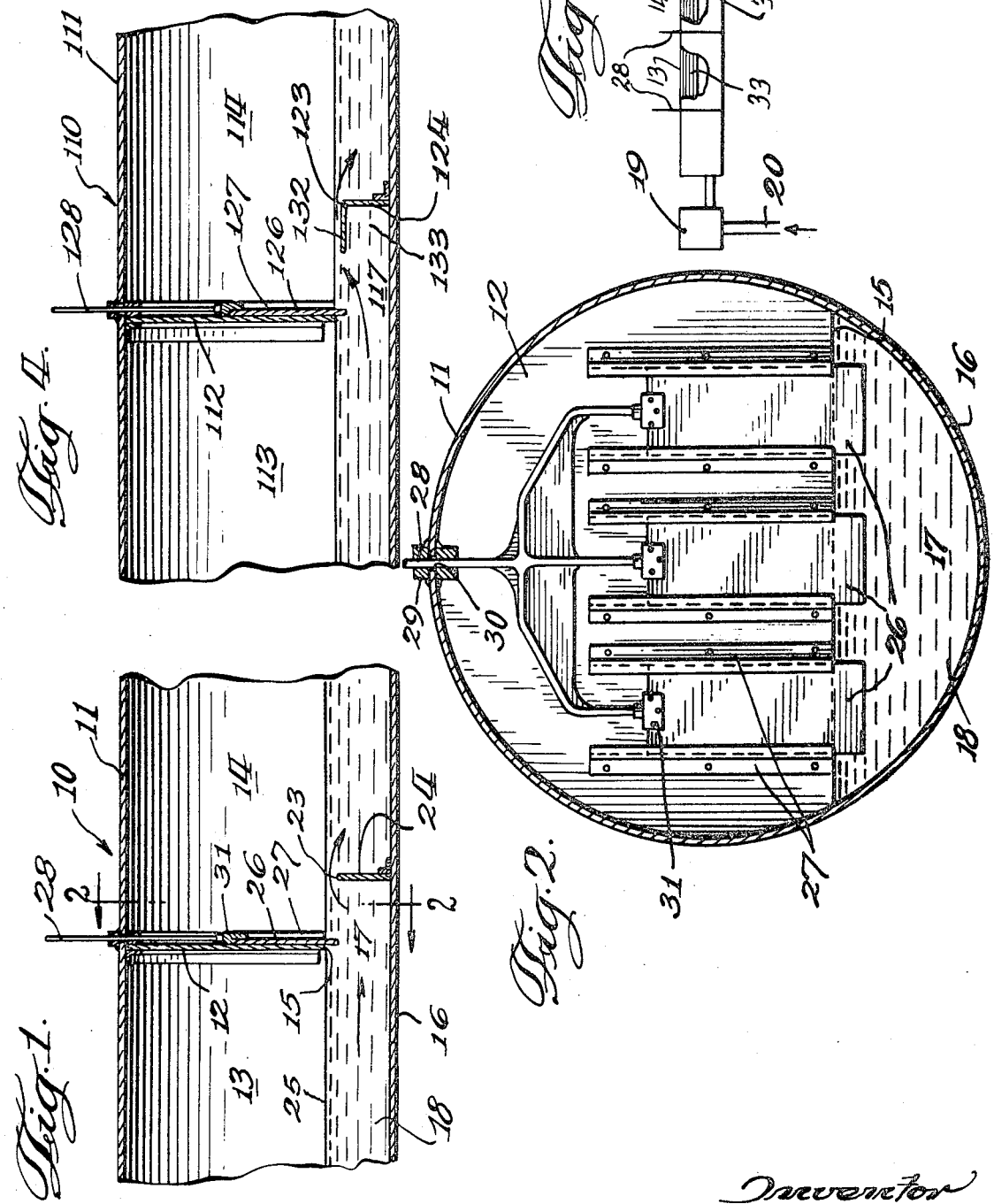

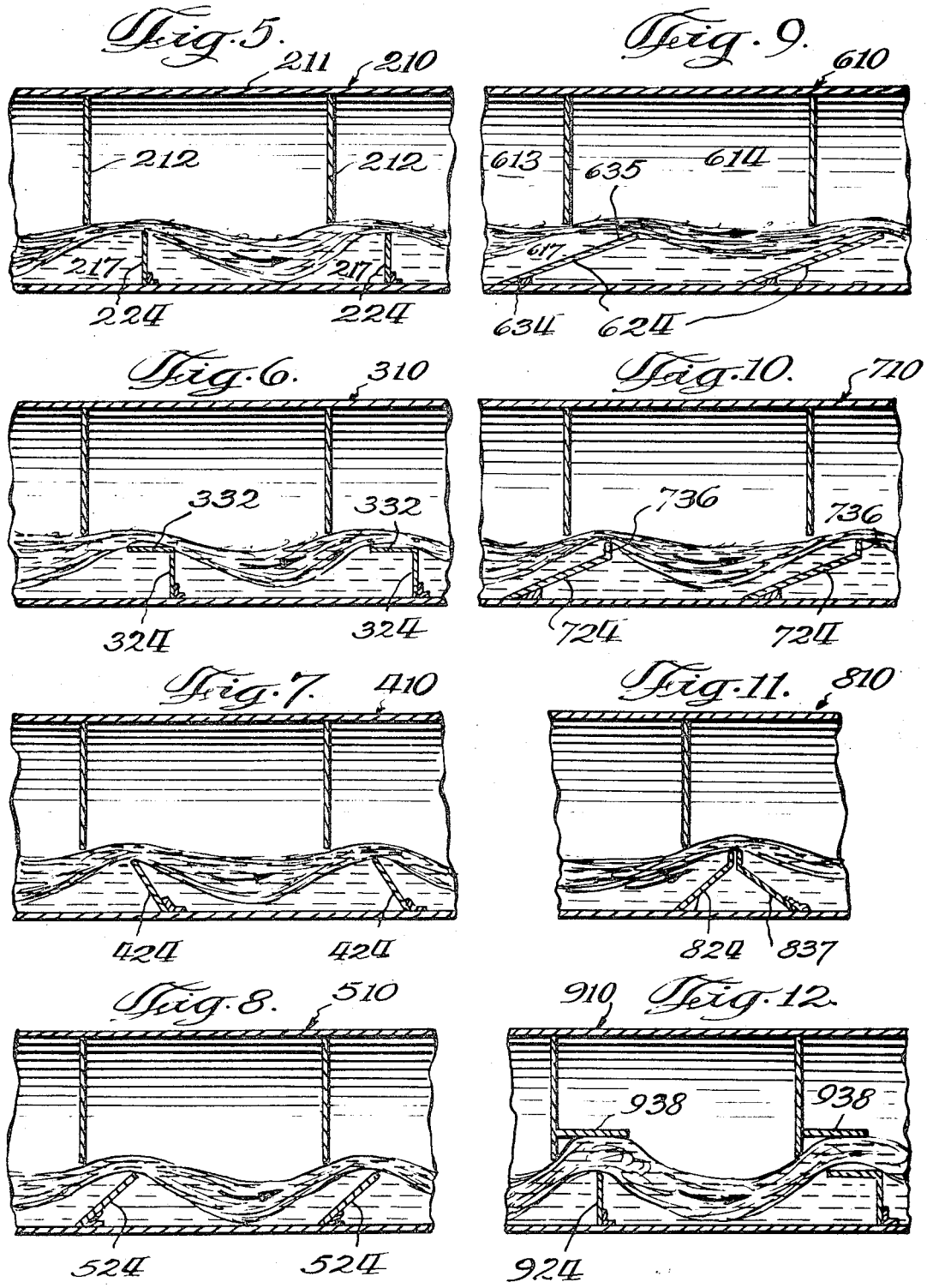

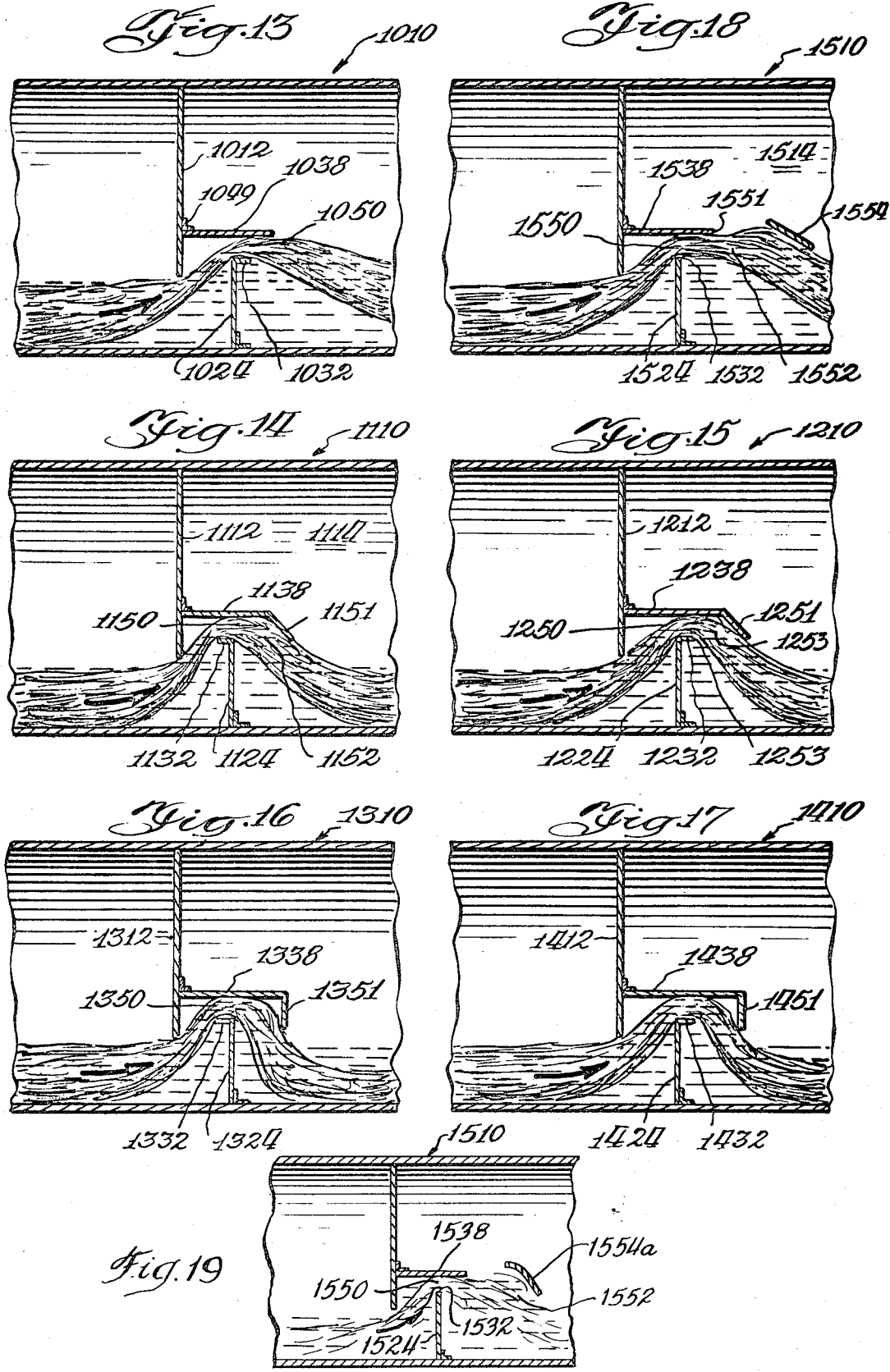

3,729,383
FLASH EVAPORATOR STRUCTURE
Richard W. Goeldner, Brookfield, Wis., assignor to Aqua-Chem, Inc.
Continuation-in-part of applications Ser. No. 94,879, Mar. 10, 1961, and Ser. No. 267,074, Mar. 14, 1963. This application Jan. 7, 1966, Ser. No. 519,355
Int. Cl. B01d 3/02
U.S. Cl. 202—173     13 Claims

ABSTRACT OF THE DISCLOSURE

A horizontally arranged multistage flash evaporator wherein a tubular vessel is divided into a plurality of flash chambers by transverse partitions in which the partitions at their lower end provide a passage for feedwater from chamber to chamber, and in which means are provided for controlling the flow of feedwater between chambers to maintain a desired level of feedwater liquid to effect a water seal between chambers.

This application is a continuation-in-part of application Ser. No. 94,879, filed Mar. 10, 1961, entitled "Flash Evaporator Structure" (now abandoned), and copending application Ser. No. 267,074, filed Mar. 14, 1963, bearing the same title now abandoned.

This invention relates to flash evaporators and in particular to long tube flash evaporator structures, such as shown in U.S. Pat. No. 3,213,000 to Reid Ewing, assigned to the assignee of the present application.

In long tube flash evaporator structures, the liquid, such as sea water, is caused to flow successively through a plurality of flash chambers, each of said chambers being maintained at successively lower pressures for flashing of the liquid flowing therethrough. For proper operation of the evaporator, it is necessary to maintain a level of liquid in each of the chambers. The present invention comprehends a control of the liquid level in the respective chambers by means of controlling the rate of flow of the liquid from the respective chambers so that during operation of the evaporator, a preselected level is maintained in each chamber, whereby a vapor seal is provided between adjacent chambers.

Thus, a principal feature of the present invention is the provision of a new and improved flash evaporator structure.

Another feature of the invention is the provision of such a flash evaporator structure including means for controlling the rate of flow of the liquid to be evaporated from the respective flash chamber structures.

A further feature of the invention is to provide such a flash evaporator structure including adjustable means for controlling the rate of flow.

Yet another feature of the invention is to provide such a flash evaporator structure having means maintaining a minimum liquid level in the respective flash chambers at all times thereby providing a vapor seal between adjacent flash chambers.

Yet another feature of the invention is the provision of such a flash evaporator structure including a horizontally extending tubular shell, an upright wall extending transversely across the shell dividing the interior thereof into a pair of flash chambers, the wall defining a passage at the lower end thereof for flow of liquid from one chamber to the other chamber, means for maintaining a flow of liquid to be evaporated successively through the one chamber, the passage, and the other chamber, a weir in the other chamber extending upwardly from the bottom of the shell to a first, horizontal plane below a second, horizontal plane of the upper end of the passage, and a flow control member extending at least partially across the flow passage for retarding the flow of the liquid through the passage to maintain a preselected level of liquid in the one chamber above the first horizontal plane.

Another feature of the invention is the provision of such a flash evaporator structure wherein the flow control member comprises a horizontally extending wall member spaced above the upper end of the weir and having a horizontal portion carried on the upright wall to extend from the wall a distance greater than the spacing of the weir from the wall, the flow control member having at its distal edge a downturned flange portion for guiding the liquid downwardly from the top edge of the weir into the lower portion of the chamber.

A still further feature of the invention is the provision of such a flash evaporator structure wherein the spacing of the downturned flange from the top edge of the weir is greater than the spacing of the flow control member vertically above the top edge of the weir.

A yet further feature of the invention is the provision of such a flash evaporator structure wherein the top edge of the weir is turned to provide improved rigidity thereof.

Another feature of the invention is the provision of such a flash evaporator structure wherein the upper edge of the weir is turned toward the dividing wall.

A further feature of the invention is the provision of such a flash evaporator structure wherein the upper edge of the weir is turned away from the dividing wall.

Still another feature of the invention is the provision of such a flash evaporator structure having a generally planar flow control member extending to above the upper edge of the weir, and a separate baffle member spaced outwardly of the distal edge of the flow control member for deflecting the liquid into the lower portion of the chamber.

Other features and advantages of the invention will be apparent from the following description taken in connection with the accompanying drawings wherein:

FIG. 1 is a fragmentary diametric section of a tubular flash evaporator provided with liquid level control means embodying the invention, and with certain elements removed for clarity of illustration;

FIG. 2 is a transverse, enlarged section taken substantially along line 2—2 of FIG. 1;

FIG. 3 is a reduced diagrammatic showing of the flash evaporator;

FIG. 4 is a diametric section similar to that of FIG. 1 and illustrating a modified form of the invention;

FIG. 5 is a fragmentary diametric section of still another flash evaporator structure embodying the invention;

FIG. 6 is a fragmentary diametric section of yet another flash evaporator structure embodying the invention;

FIG. 7 is a fragmentary diametric section of a still further flash evaporator structure embodying the invention;

FIG. 8 is a fragmentary diametric section of a further flash evaporator structure embodying the invention;

FIG. 9 is a fragmentary diametric section of a still further flash evaporator structure embodying the invention;

FIG. 10 is a fragmentary diametric section of yet another flash evaporator structure embodying the invention;

FIG. 11 is a fragmentary diametric section of a further flash evaporator structure embodying the invention;

FIG. 12 is a fragmentary diametric section of a yet further flash evaporator structure embodying the invention;

FIG. 13 is a fragmentary diametric section of another flash evaporator structure embodying the invention;

FIG. 14 is a fragmentary diametric section of still another flash evaporator structure embodying the invention;

FIG. 15 is a fragmentary diametric section of yet another flash evaporator structure embodying the invention;

FIG. 16 is a fragmentary diametric section of a further flash evaporator structure embodying the invention;

FIG. 17 is a fragmentary diametric section of a still further flash evaporator structure embodying the invention;

FIG. 18 is a fragmentary diametric section of a yet further flash evaporator structure embodying the invention; and FIG. 19 is a fragmentary diametric section similar to FIG. 18, and showing a modification thereof.

In the exemplary embodiment of the invention as disclosed in FIGS. 1, 2 and 3 of the drawing, a flash evaporator structure generally designated 10 is shown to comprise an enclosure, herein a horizontally extending tubular shell 11, and an upright wall 12 extending transversely across the shell and dividing the interior thereof into a pair of flash chambers 13 and 14. The lower end 15 of the wall 12 is spaced above the bottom 16 of the shell to define therewith a passage 17 for flow of liquid such as sea water 18 from chamber 13 to chamber 14. As illustrated schematically in FIG. 3, liquid 18 may be passed through the evaporator 10 by means of a pump 19 from a supply inlet 20, the unevaporated liquid being passed from the evaporator through an outlet 21, and the distillate being delivered from the evaporator through an outlet 22. The upper level 25 of liquid 18 divides each chamber into a condensing portion or section above the liquid, and a liquid receiving portion at the lower section of each chamber. As is conventional in all multistage flash evaporators, means are provided in the condensing portion of each chamber for condensing flashed vapors, and herein this means may take the form of tubes 33 extending from end-to-end of the evaporator 10. As is explained in detail in Pat. No. 3,213,000, relatively cool feed water is passed through the tubes 33 to condense the flashed vapors, and this distillate is collected in a trough 34 which communicates with outlet 22. The pressure differential between adjacent chambers is established and maintained by the temperature difference of the condensing water.

The liquid 18 is maintained in the shell 11 at all times at at least the level of the horizontal plane defined by the upper end 23 of a weir 24 extending across the lower portion of the flash chamber adjacently downstream of the flow passage 17.

As best seen in FIG. 1, the horizontal plane of the upper end 23 of weir 24 is disposed below the horizontal plane of the lower end 15 of wall 12. Herein, the spacing between the planes is approximately 1". To preclude passage of vapor from flash chamber 13 to flash chamber 14 during operation of the flash evaporator (as would tend to occur because of the lower pressure in chamber 14), it is necessary to maintain the upper level 25 of the liquid 18 at or above the horizontal plane of the wall lower end 15. For this purpose, orifice means is provided between adjacent chambers and include a plurality of flow control or regulating members 26 which are adjustably mounted on wall 12 to extend to below the horizontal plane of wall end 15 and into the flow passage 17. Each flow control member 26 comprises a flat plate member vertically slidable in a pair of spaced channels 27 secured to the wall 12. A control arm 28 extends through a suitable sealing bushing 29 at an opening 30 in the upper portion of the shell 11 and is connected to the upper end of each flow control member by a suitable securing device 31 for adjustable retardation of the flow of liquid 18 through flow passage 17. The dynamic retardation of the liquid flow causes the level 25 of the liquid to be maintained above the horizontal plane of the weir end 23, and by suitably adjusting the flow control members in relationship to the rate of flow of the liquid through the flash evaporator 10, the level 25 may be readily maintained at or above the horizontal plane of the lower end 15 of wall 12 to maintain the vapor seal between the flash chambers during operation of the flash evaporator. It will be readily apparent to one skilled in the art that the above described orifice means can be adjusted to maintain a proper feed water operating level and a vapor seal despite unforseen operating conditions and despite seasonal variations in the operating conditions.

In addition to retarding the flow of the liquid through the flow passage 17, the flow control members 26 cause the flow to become highly turbulent thereby improving the efficiency of flashing in the subsequent flash chamber.

Turning now to FIG. 4, a modified form of flash evaporator generally designated 110 is shown to comprise a flash evaporator generally similar to flash evaporator 10 but having a weir 124 provided with a shelf 132 extending horizontally from the upper end 123 of the weir toward the flow passage 117. The shelf 132 extends fully across the interior of the shell 111 to define with the weir 124 an eddy space 133 providing further control of the liquid flow from the chamber 113 to the chamber 114. Elements of evaporator 110, which are similar to corresponding elements of evaporator 10, are identified by similar numerals but 100 higher. Other than as discussed above, evaporator 110 is similar to evaporator 10 and functions in a similar manner.

Referring now to FIGS. 5-12, eight additional forms of flash evaporator structures embodying the invention are illustrated. More specifically, as shown in FIG. 5, a flash evaporator structure generally designated 210 is shown to comprise a tubular shell 211 provided with upright dividing walls 212 and co-operating weirs 224. The weirs 224 extend upwardly to a horizontal plane disposed below the horizontal plane of the lower end of the dividing walls 212. The spacing between the horizontal planes and the spacing of the weirs from the dividing walls longitudinally of the shell 211 are coordinated with the rate of flow of the liquid through the evaporator to effect a build-up of the liquid in the passages 217 sufficiently to close the passages against the flow of vapor between the adjacent chambers.

In FIG. 6, a flash evaporator 310 is shown to comprise an evaporator generally similar to evaporator 210 but including weirs 324 provided with turned shelf portions 332 functioning generally similarly to the shelved weirs 124 of evaporator 110. In FIG. 7, a flash evaporator structure 410 is shown to be generally similar to evaporator structure 210 except that the weirs 424 are inclined in an upstream direction. In FIG. 8, a flash evaporator structure 510 is shown to comprise a structure generally similar to that of evaporator structure 410 except that the weirs 524 are inclined in a downstream direction. In FIG. 9, a flash evaporator structure 610 is shown to comprise a flash evaporator generally similar to evaporator 510 but having elongated weirs 624 extending through passages 617 to have their lower upstream ends 634 disposed in the upstream chamber 613, and their upper downstream ends 635 disposed in the downstream chamber 614. In FIG. 10, a flash evaporator structure 710 is shown to comprise a flash evaporator generally similar to flash evaporator 610 but having elongated weirs 724 provided with upturned distal ends 736.

In FIG. 11, a flash evaporator structure 810 is shown to include a pair of juxtaposed weirs 824 and 837 respectively inclined and declined in the direction of flow of the fluid through the evaporator. In FIG. 12, a flash evaporator structure 910 is shown to include a weir 924 generally similar to weir 224 of flash evapoator structure 210 and a superposed baffle plate 938 limiting the upward movement of the liquid as it passes over the weir 924.

Thus, flash evaporator structures 210, 310, 410, 510, 610, 710 810 and 910 are each generally similar to flash evaporator structure 10 in that the control of the height of the liquid in the flow passages between the evaporator chambers is dynamically controlled to maintain the level at or above the horizontal plane of the lower end of the dividing wall between the respective chambers notwithstanding the fact that in each structure the associated weir terminates upwardly in a horizontal plane spaced below the horizontal plane of the lower end of the dividing wall. In each of the latter evaporator structures, however, the weirs maintain the minimum level of the liquid during normal operation of the evaporator at or above the horizontal plane of the upper end thereof.

Turning now to FIG. 13 another form of flash evaporator structure generally designated 1010 is shown to include a weir member 1024 having a turned upper edge 1032 extending away from the dividing wall 1012. A flow control shelf or baffle 1038 is secured to the dividing wall 1012 by suitable means such as bracket 1049 to be spaced above the upper weir edge 1032 to provide a restricted flow passage 1050 therebetween for controlling the rate of flow of the water through the evaporator.

Referring now to FIG. 14, still another form of flash evaporator structure 1110 is shown to include a weir 1124 extending transversely across the flash chamber 1114 having a turned upper edge 1132 extending toward the dividing wall 1112. Spaced above the upper edge 1132 of the weir 1124 is a horizontal flow control plate 1138 defining therebetween a restricted flow passage 1150. As shown, the baffle plate 1138 extends outwardly from the dividing wall 1112 a distance greater than the spacing of the weir 1124 from the dividing wall and the distal edge 1151 of the plate 1138 is downturned at an angle to the vertical to define a restricted flow passage 1152 between the flange 1151 and the edge 1132 of weir 1124. In the preferred embodiment, the spacing between flange 1151 and weir edge 1132 is greater than the spacing between the horizontal plate 1138 and the edge 1132 whereby flow passage 1150 provides a greater restriction to flow of the liquid through the evaporator than does flow passage 1152.

In FIG. 15, a modified form of flash evaporator structure generally designated 1210 is shown to comprise a structure generally similar to flash evaporator structure 1110 except that the turned edge 1232 of weir 1224 extends away from the dividing wall 1212. As shown in FIG. 15, the spacing between the downturned flange 1251 and the distal edge 1253 of the weir edge 1232 is greater than the spacing between the weir edge 1232 and the superjacent flow control plate 1238 to provide the desired maximum flow restriction in the flow passage 1250 between flange 1232 and plate 1238.

In FIG. 16, a flash evaporator structure generally designated 1310 is shown to comprise a structure generally similar to flash evaporator structure 1110 except that the downturned flange 1351 extends perpendicularly downwardly from the flow control plate 1338.

In FIG. 17, a flash evaporator structure generally designated 1410 is shown to comprise a structure generally similar to flash evaporator structure 1210 except that the downturned flange 1451 extends perpendicularly downwardly from the plate 1438.

In FIG. 18, another form of flash evaporator structure generally designated 1510 is shown to include a weir member 1524 having its top edge 1532 spaced below a horizontally extending flow control plate 1538 to define therebetween a flow passage 1550. A separate baffle member 1554 extends across the flow chamber 1514 spaced outwardly from the distal edge 1551 of the plate 1538. The baffle member 1554 is inclined downwardly to define a downwardly directed flow passage 1552 between the baffle member 1554 and the top edge 1532 of the weir 1524. The baffle member may be curved, if desired, as shown at 1554a in FIG. 19.

In each of the flash evaporator structures 1210, 1310, 1410 and 1510, the spacing between the top edge of the weir and the flange or baffle plate directing the liquid downwardly into the bottom portion of the flash evaporator chamber is preferably greater than the vertical spacing between the top edge of the weir and the overlying flow control deflector plate so that the greatest flow restriction occurs in the flow passage between the latter elements. In the illustrated embodiments the flange or baffle plate extends across the flash chamber and directs the liquid downwardly into the lower portion of the flash chamber for improved flashing action therein. The brackets 1049 may be adjustably secured to the dividing wall so as to provide an adjustable flow restriction in the flow passage above the weir for improved control of the liquid flow and resultant improving flash evaporation.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a flash evaporator, a horizontally extending enclosure, an upright wall extending transversely across the enclosure dividing the interior thereof into a pair of flash chambers, means defining a passage for flow of liquid from one chamber to the other chamber at the lower end of said wall; means for maintaining a flow of liquid to be evaporated successively through said one chamber, said passage, and said other chamber; a flow control upright weir in said other chamber extending across said other chamber at a distance from said wall and having a top edge; and a deflector plate extending across said other chamber and having a portion carried on said wall to extend horizontally above said top edge and define a restrictive flow passage therebetween, said portion having an outer edge spaced from said wall a distance at least equal to the spacing of said weir from said wall, and a baffle spaced outwardly of said restrictive flow passage and extending transversely thereto arranged to guide the liquid downwardly from said restrictive flow passage into the lower portion of said other chamber.

2. The flash evaporator of claim 1 wherein said baffle is integral with said deflector plate.

3. The flash evaporator of claim 1 wherein said baffle is spaced from said deflector plate.

4. The flash evaporator of claim 1 wherein said baffle is spaced from the top edge of the weir a distance preselected to make the flow passage therebetween greater in cross-section than said restrictive flow passage.

5. In a flash evaporator, a horizontally extending enclosure, an upright wall extending transversely across the enclosure dividing the interior thereof into a pair of flash chambers, means defining a passage for flow of liquid from one chamber to the other chamber at the lower end of said wall; means for maintaining a flow of liquid to be evaporated successively through said one chamber, said passage, and said other chamber; a flow control upright weir in said other chamber extending across said other chamber at a distance from said wall and having a top edge; and a deflector plate extending across said other chamber and having a portion carried on said wall to extend horizontally above said top edge and define a restrictive flow passage therebetween, said portion having an outer edge spaced from said wall a distance greater than the spacing of said weir from said wall, and a flange portion downturned from said outer edge for guiding the liquid downwardly from said restrictive flow passage into the lower portion of said other chamber.

6. The flash evaporator of claim 5 wherein said flange portion extends at an acute angle to the vertical.

7. The flash evaporator of claim 5 wherein said flange portion extends vertically.

8. The flash evaporator of claim 5 wherein said flange is spaced from the top edge of the weir a distance preselected to make the flow passage therebetween greater in cross-section than said restrictive flow passage.

9. In a flash evaporator, a horizontally extending enclosure, an upright wall extending transversely across the enclosure dividing the interior thereof into a pair of flash chambers, means defining a passage for flow of liquid from one chamber to the other chamber at the lower end of said wall; means for maintaining a flow of liquid to be evaporated successively through said one chamber, said passage, and said other chamber; a flow control upright weir in said other chamber extending across said other chamber at a distance from said wall and having a top edge turned to extend horizontally for guiding the liquid thereover and concomitantly stiffening said weir; and a deflector plate extending across said other chamber and having a portion carried on said wall to extend horizontally above said top edge and define a restrictive flow passage therebetween, said portion having an outer edge spaced from said wall a distance greater than the spacing of said weir from said wall, and baffle means extending across the chamber outwardly of said restrictive flow passage for guiding the liquid downwardly from said restrictive passage into the lower portion of said other chamber.

10. The flash evaporator of claim 9 wherein said turned weir edge extends toward said upright wall.

11. The flash evaporator of claim 9 wherein said turned weir edge extends away from said upright wall.

12. In a flash evaporator, a horizontally extending enclosure, an upright wall extending transversely across the enclosure dividing the interior thereof into a pair of flash chambers, said wall defining a passage for flow of liquid from one chamber to the other chamber at the lower end thereof; means for maintaining a flow of liquid to be evaporated successively through said one chamber, said passage, and said other chamber; a flow control upright weir in said other chamber extending across said other chamber at a distance from said wall and having a horizontally turned top edge; and a deflector plate extending horizontally across said other chamber and having a portion carried on said wall to extend in a horizontal plane above said top edge and define a restrictive flow passage therebetween, said portion having an outer edge spaced from said wall a distance greater than the spacing of said weir from said wall, and a flange portion downturned from said outer edge for guiding the liquid downwardly from said restrictive flow passage into the lower portion of said other chamber, said flange portion being spaced from said top edge of the weir a distance preselected to make the flow passage therebetween greater in cross-section than said restrictive flow passage.

13. In a flash evaporator, a horizontally extending enclosure, an upright wall extending transversely across the enclosure dividing the interior thereof into a pair of flash chambers, means defining a passage for flow of liquid from one chamber to the lower end of said wall; means for maintaining a flow of liquid to be evaporated successively through said one chamber, said passage, and said other chamber; a flow control upright weir in said other chamber extending across said other chamber at a distance from said wall and having a top edge; and a deflector plate extending across said other chamber and having a portion adjustably carried on said wall to extend horizontally above said top edge and define a restrictive flow passage therebetween, said portion having an outer edge spaced from said wall a distance at least equal to the spacing of said weir from said wall, and a baffle spaced outwardly of said restrictive flow passage and extending transversely thereto arranged to guide the liquid downwardly from said restrictive flow passage into the lower portion of said other chamber.

References Cited

UNITED STATES PATENTS

| | | | |
|---|---|---|---|
| 2,073,610 | 3/1937 | Danel | 61—28 X |
| 3,003,931 | 10/1961 | Worthen | 203—40 |
| 3,161,558 | 12/1964 | Pavelic | 202—173 X |
| 3,172,824 | 3/1965 | Mulford | 202—173 |
| 3,174,914 | 3/1965 | Worthen | 202—173 |
| 3,180,805 | 4/1965 | Chirico | 202—173 |
| 3,192,132 | 6/1965 | Loebel | 202—173 |
| 3,213,000 | 10/1965 | Ewing | 202—173 |
| 3,219,553 | 11/1965 | Hughes | 202—173 |
| 3,228,859 | 1/1966 | Frankel | 202—173 |

FOREIGN PATENTS

| | | | |
|---|---|---|---|
| 1,052,950 | 3/1959 | Germany | 202—173 |

NORMAN YUDKOFF, Primary Examiner

U.S. Cl. X.R.

137—154; 138—43